US012166649B2

(12) United States Patent
Singh et al.

(10) Patent No.: US 12,166,649 B2
(45) Date of Patent: *Dec. 10, 2024

(54) DYNAMIC ROUTING AND POLICY SHAPING FOR AGGREGATED NETWORK

(71) Applicant: GOGO BUSINESS AVIATION LLC, Broomfield, CO (US)

(72) Inventors: Yashvardhan Singh, Erie, CO (US); Zhiyong Wang, Vernon Hills, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,669

(22) Filed: Sep. 6, 2023

(65) Prior Publication Data
US 2024/0283716 A1 Aug. 22, 2024

Related U.S. Application Data

(63) Continuation of application No. 18/172,470, filed on Feb. 22, 2023, now Pat. No. 11,757,737.

(51) Int. Cl.
*G06F 15/173* (2006.01)
*H04L 12/46* (2006.01)
(Continued)

(52) U.S. Cl.
CPC ........ *H04L 43/028* (2013.01); *H04L 12/4641* (2013.01); *H04L 41/0894* (2022.05); *H04L 43/0888* (2013.01)

(58) Field of Classification Search
CPC .............. H04L 43/028; H04L 41/0894; H04L 12/4641; H04L 43/0888
See application file for complete search history.

(56) References Cited

U.S. PATENT DOCUMENTS 8,259,722 B1 * 9/2012 Kharitonov ............. H04L 49/50
370/396
11,115,385 B1 9/2021 Patel et al.
(Continued)

OTHER PUBLICATIONS

International Search Report and Written Opinion for International Application No. PCT/US2024/016597 dated Jun. 7, 2024.

*Primary Examiner* — Duyen M Doan
(74) *Attorney, Agent, or Firm* — MARSHALL, GERSTEIN & BORUN LLP; Randall G. Rueth

(57) ABSTRACT

Systems and methods of policy shaping for an aggregated network include (A) receiving a first request to deliver first content to a first device being transported by a vehicle; (B) receiving a second request to deliver second content to a second device being transported by the vehicle; (C) determining (i) a first communication protocol corresponding to the first request and (ii) a second communication protocol corresponding to the second request; (D) determining (i) a first count corresponding to the first content and (ii) a second count corresponding to the second content; and (E) applying (i) a first policy, based on the first communication protocol and the first count, to a first forward data stream including the first content and (ii) a second policy, based on the second communication protocol and the second count, to a second forward data stream including the second content.

18 Claims, 7 Drawing Sheets

(51) Int. Cl.
    *H04L 41/0894*     (2022.01)
    *H04L 43/028*     (2022.01)
    *H04L 43/0888*     (2022.01)

(56) References Cited

U.S. PATENT DOCUMENTS

| | | | |
|---|---|---|---|
| 11,265,254 | B1 | 3/2022 | Vemuri et al. |
| 11,272,519 | B2 * | 3/2022 | Karlsson ............. H04W 28/021 |
| 11,522,773 | B1 * | 12/2022 | Tedesco ................ H04L 43/028 |
| 11,553,377 | B2 | 1/2023 | Strasman |
| 2018/0034942 | A1 * | 2/2018 | Jalil ................... H04L 41/0895 |
| 2018/0262885 | A1 | 9/2018 | Still |
| 2020/0228535 | A1 | 7/2020 | Watson |
| 2022/0312181 | A1 | 9/2022 | Sumien et al. |
| 2022/0321467 | A1 * | 10/2022 | Szigeti ................... H04L 45/74 |
| 2023/0354084 | A1 * | 11/2023 | Baek ........................ H04L 1/08 |

\* cited by examiner

DYNAMIC ROUTING AND POLICY SHAPING FOR AGGREGATED NETWORK

CROSS-REFERENCE TO RELATED APPLICATIONS

This application is a continuation of, and claims the benefit of the filing date of, U.S. patent application Ser. No. 18/172,470, filed Feb. 22, 2023 and titled "Dynamic Routing and Policy Shaping for Aggregated Network," the entirety of which is incorporated by reference herein.

TECHNICAL FIELD

The instant disclosure generally relates to delivering communications to and from devices that are on-board vehicles via an aggregated network, and, in particular, to a system that routes and applies various policies to traffic from the devices.

BACKGROUND

Some existing airlines and other transportation companies provide services, such as Wi-Fi or other data delivery services, to devices that are on-board a vehicle while the vehicle is traveling to a destination. The on-board devices may be, for example, devices that are fixedly connected to the vehicle (e.g., a device that is included in a Line Replaceable Unit (LRU) on an aircraft), or the on-board devices may be a mobile computing device such as a smart phone, tablet or laptop computing device that are temporarily being transported by the vehicle. To establish communications for services to such on-board devices, providers often utilize a wireless communication link such as a direct Air-to-Ground (ATG) link or a satellite link over which communications or data is delivered to and from the vehicle. The wireless communication link is typically a bi-directional communication link over which all forward data (i.e., data delivered to the vehicle) and all reverse data (i.e., data sent from the vehicle) is transmitted and received.

Multi-modem solutions are often implemented on-board vehicles to improve performance and reliability of Wi-Fi over single-modem solutions. For example, 5G solutions (ATG, satellite, or other suitable means) may be implemented in conjunction with 4G solutions. While 5G availability is expanding in coverage regions, at the present time, there is not full 5G coverage in the United States; whereas 4G coverage is fully available throughout the U.S. When a vehicle is traveling across different coverage zones, on-board devices on the vehicle may switch between the communication protocols (e.g., switching between 4G+5G coverage mode to just 4G coverage mode) such as telecommunication standards. Accordingly, having multiple communication protocols implemented using a multi-modem solution on a vehicle presents certain challenges of how to identify which communication protocol (and modem) each on-board device is using at any given moment. The identification may be important for routing or applying separate policies to data streams of a given device based on the communication protocol used by the given device.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Aspects of the present disclosure provide a policy shaping system for an aggregated network include a deep packet inspection (DPI) engine that is communicatively connected, via a plurality of data tunnels, to a plurality of devices that are being transported by a vehicle, the DPI engine including: one or more processors; and one or more non-transitory, tangible computer-readable storage media storing computer-executable instructions that, when executed by the one or more processors, cause the DPI engine to: (A) receive, via a first data tunnel of the plurality of data tunnels, a first request to deliver first content to a first one or more devices of the plurality of devices being transported by the vehicle; (B) receive, via a second data tunnel of the plurality of data tunnels, a second request to deliver second content to a second one or more devices of the plurality of devices being transported by the vehicle; (C) determine (i) a first communication protocol corresponding to the first request and (ii) a second communication protocol corresponding to the second request; (D) determine (i) a first count corresponding to a first data size of the first content and (ii) a second count corresponding to a second data size of the second content; and (E) apply (i) a first policy, based on the first communication protocol and the first count, to a first forward data stream to be sent to the vehicle, wherein the first forward data stream includes the first content and (ii) a second policy, based on the second communication protocol and the second count, to a second forward data stream to be sent to the vehicle, wherein the second forward data stream includes the second content.

In some aspects, the one or more non-transitory, tangible computer-readable storage media store computer-executable instructions that, when executed by the one or more processors, further cause the DPI engine to: (A) detect a first condition indicating that the first tunnel is either not in operation or is degraded; (B) receive, via the second data tunnel of the plurality of data tunnels, an additional first request to deliver additional first content to at least one of the first one or more devices of the plurality of devices being transported by the vehicle; (C) in response to detecting the first condition, determine the second communication protocol corresponds to the additional first request; (D) adjust the second count based on an additional first data size of the additional first content; and (E) apply the second policy, based on the second communication protocol and the adjusted second count, to an additional first forward data stream to be sent to the vehicle, wherein the additional first forward data stream includes the additional first content.

In some aspects, (i) the first communication protocol is determined to correspond to the first request based on a first marker included in a first ECN bit of the first request, and (ii) the second communication protocol is determined to correspond to the second request based on a second marker included in a second ECN bit of the second request.

In some aspects, (i) the first communication protocol is determined to correspond to the first request based on a first marker included in a first IP options message of the first request, and (ii) the second communication protocol is determined to correspond to the second request based on a second marker included in a second IP options message of the second request.

In some aspects, (i) the first communication protocol is determined to correspond to the first request based on a first VLAN classifier of the first request, and (ii) the second communication protocol is determined to correspond to the second request based on a second marker included in a second VLAN classifier of the second request.

In some aspects, wherein both the first data tunnel and the first communication protocol correspond to a 4G protocol and both the second data tunnel and the second communication protocol correspond to a 5G protocol. In yet further aspects, a first throughput limit of the first policy is lower than a second throughput limit of the second policy.

Another aspect of the present disclosure provides a method of policy shaping for an aggregated network including: (A) receiving, at a deep packet inspection (DPI) engine, via a first data tunnel of a plurality of data tunnels that are communicatively connected to a plurality of devices that are being transported by a vehicle, a first request to deliver first content to a first one or more devices of the plurality of devices being transported by the vehicle; (B) receiving, at the DPI engine, via a second data tunnel of the plurality of data tunnels, a second request to deliver second content to a second one or more devices of the plurality of devices being transported by the vehicle; (C) determining, by the DPI engine, (i) a first communication protocol corresponding to the first request and (ii) a second communication protocol corresponding to the second request; (D) determining, by the DPI engine, (i) a first count corresponding to a first data size of the first content and (ii) a second count corresponding to a second data size of the second content; and (E) applying, by the DPI engine, (i) a first policy, based on the first communication protocol and the first count, to a first forward data stream to be sent to the vehicle, wherein the first forward data stream includes the first content and (ii) a second policy, based on the second communication protocol and the second count, to a second forward data stream to be sent to the vehicle, wherein the second forward data stream includes the second content.

BRIEF DESCRIPTION OF THE DRAWINGS

The skilled artisan will understand that the figures described herein are included for purposes of illustration and are not limiting on the present disclosure. The drawings are not necessarily to scale, emphasis instead being placed upon illustrating the principles of the present disclosure. It is to be understood that, in some instances, various aspects of the described implementations may be shown exaggerated or enlarged to facilitate an understanding of the described implementations. In the drawings, like primary characters throughout the various drawings generally refer to functionally similar or structurally similar components.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Exemplary Aggregated Network System

Figure 1:
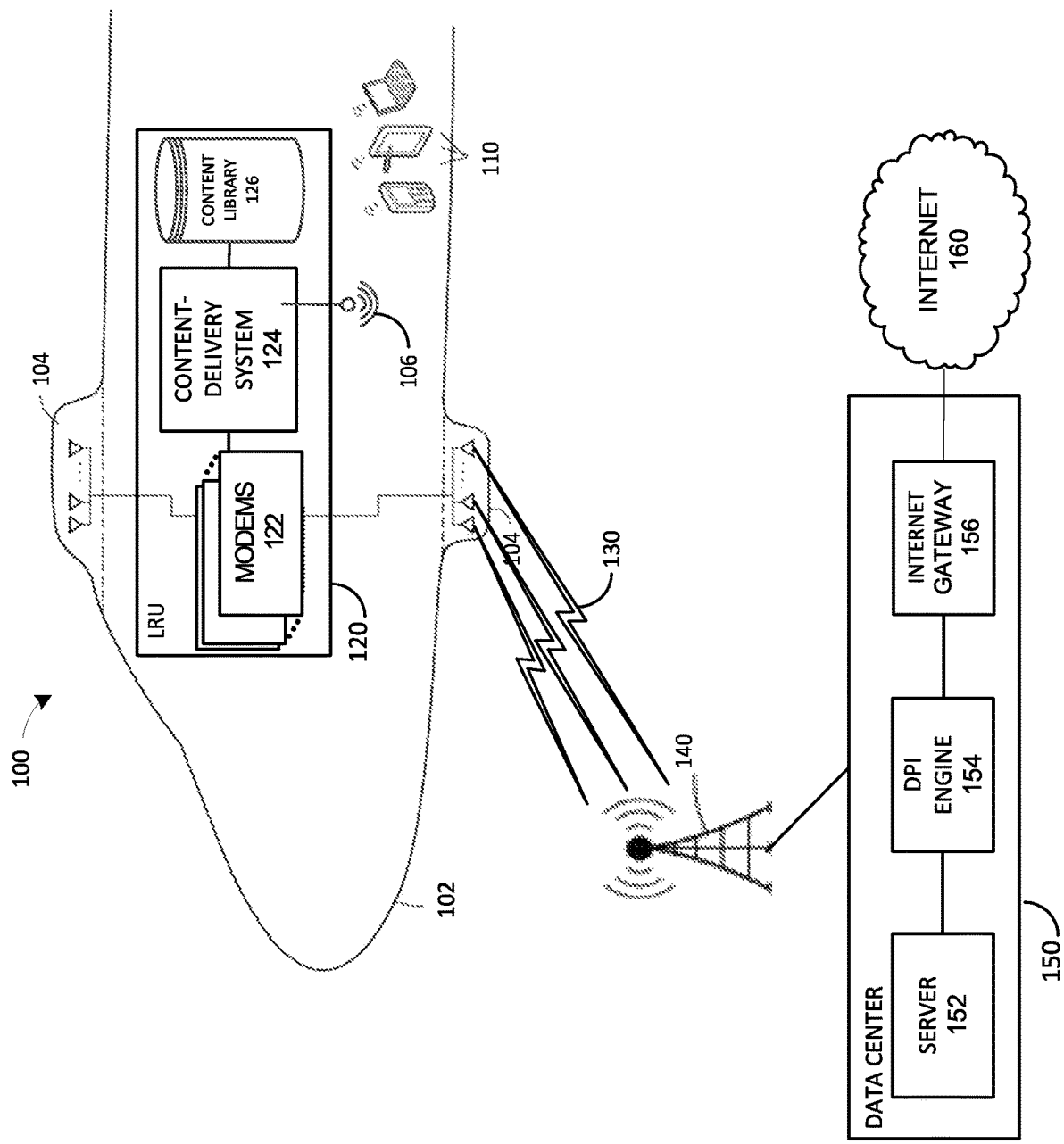
FIG. 1 illustrates an exemplary aggregated network system for delivering data to and from devices that are on-board a vehicle.

FIG. 1 illustrates an example system 100, according to an embodiment, for marking internal data packets transmitted to/from electronic devices 110 being transported aboard an aircraft 102 to indicate communication protocols corresponding to each packet to enable policy shaping in an aggregated network. The aircraft 102 may be associated with one or more communication networks and/or links, such as (i) a communication network 106 to provide communication services to electronic devices 110 while the electronic devices 110 are disposed within the aircraft 102, and/or (ii) a communication link 130 between the aircraft 102 and a terrestrial base station 140 connected to a data center 150.

The aircraft 102 may be a private, commercial, business, cargo, recreational, and/or another types of aircraft. The aircraft 102 may be owned and/or operated by a specific individual. In some cases, the aircraft 102 may be owned and/or operated by a company, organization or government entity. In some cases, the aircraft 102 may be included in a fleet of vehicles that are used to transport passengers who pay for or otherwise are granted passage on one of the vehicles of the fleet. The aircraft 102 may be used by an organization to transport employees and their guests, in some situations. The aircraft 102 may be used to transport live or inanimate cargo, packages, mail, and/or other types of cargo. It is noted that although FIG. 1 depicts the aircraft 102, the techniques and principles described herein equally apply to other types of vehicles such as trucks, automobiles, busses, trains, boats, ships, barges, subway cars, helicopters and/or other types of aircraft, ambulances and/or other emergency vehicles, military vehicles, other air-borne, water-borne, or land-borne vehicles, and/or vehicles that are suitable for space travel. While not shown in FIG. 1 for clarity of illustration, the aircraft 102 may include electronics systems such as avionics systems (or equivalents for non-aircraft vehicles), such as communication systems, navigation systems, instrumentation, flight-control systems, or collision avoidance systems. The electronics system may also include non-avionics systems (e.g., electronics not specifically designed for use in an aircraft) such as control systems, data distribution devices, etc.

As many of the electronics systems of the aircraft 102 may require a degree of stability and/or secure attachment during transportation, at least some of the electronics systems may be included in a line replaceable unit (LRU) 120 that is fixedly or rigidly attached to the aircraft 102. The LRU 120 may be comprised of modular components that may be sealed units of an aircraft, which are designed to be replaced within a short time without using specialized tools enabling the aircraft 102 to quickly return to service, while LRU 120 is being tested and repaired. Typically, the LRU 120 is an electronic assembly that performs a specific function in the aircraft 102 and may be removed or replaced as a unit and serviced at a vehicle maintenance center. Some of the electronics systems of the aircraft 102 may not be included in the LRU 120. For example, instead of being fixedly connected to the aircraft 102 via the LRU 120, some electronics systems may be fixedly connected to the aircraft 102 using some other means, such as a bracket or other connecting device. As illustrated, the LRU 120 includes modems 122, a content-delivery system 124, and a content library 126.

The one or more modems 122 may be configured to be compatible with a plurality of different communication standards utilized by the ATG communication links 130 (or other possible links such as satellite-based communication link(s)). For example, the communication links 130 may utilize communication protocols associated with terrestrial communications (e.g., TDMA, GSM, CDMA, LTE, WiMAX, Wi-Fi, 4G, 5G, etc.) and/or associated with frequencies in the $K_a$ band, the Ku band, the L band, and/or any other suitable wireless communication frequency bands. Each of a plurality of modems 122 may be connected (wired or wirelessly) to at least one respective antenna 104. Each of the modems 122 may operate over one or more frequency bands and the aircraft 102 may utilize the modems 122 to receive data or to transmit data from the aircraft 102. For example, the aircraft 102 may include thereon one modem of the modems 122 tuned to a frequency band that is allocated for direct communications between the aircraft 102 and ground stations, or on which a direct air-to-ground (ATG) communication link is supported (e.g., 849-851 MHz. and 894-896 MHZ). The aircraft 102 may additionally or alternatively include thereon one modem of the modems 122 tuned to a frequency band that is allocated for satellite communications such as the L band (e.g., 40 to 60 GHz. or 1 to 2 GHZ), the Ku band (e.g., 12-18 GHZ), the $K_a$ band (e.g., 26.5-40 GHZ), and/or other spectrum that is allocated for satellite communications. Furthermore, each of the modems 122 may operate in accordance with certain communication protocols. For example, at least one of the modems 122 may operate in accordance with a 4G communication protocol and at least one of the modems 122 may operate in accordance with a 5G communication protocol.

The content-delivery system 124 is configured to, among other things, deliver content from the content library 126 to the electronic devices 110 via the communication network 106. The electronic devices 110 may include any mobile computing device, such as a smartphone, a tablet, a laptop computer, a personal digital assistant, an e-reader, smart glasses, smart watches, and/or any other mobile computing device capable of wireless communications. The electronic devices 110 may initiate requests, in response to user input, for example, for content. The content-delivery system 124 may deliver content to the electronic devices 110 regardless of its connection to an external network, such as the Internet 160. The content-delivery system 124 may be configured to provide an interface to the electronic devices 110 via the communication network 106 to view a list of content, select content, view content, download content, or purchase content or access to content, such as via the Internet 160 or the content library 126.

As used herein, content includes, but is not limited to, media content, which may include audio and/or visual information. The content may be presented at a user interface of one or more of the electronic devices 110, in response to, for example, one or more requests from the one or more electronic devices 110 to deliver the content to the one or more electronic devices 110. Some examples of media content include movies, television shows, songs, video games, digital magazines, news feeds, web data, applications, messages, or any other content involving textual, audio and/or visual presentation. In other words, content may include anything that can be provided as output to a display component (e.g., a screen) and/or an audio component (e.g., a speaker) of an electronic device (e.g., the electronic devices 110). Content may also include software, configuration data, files, etc. that may be installed in, applied to, made available (e.g., as a file server) via the aircraft 102 or a system of the aircraft 102 (e.g., the LRU 120) by, for example, maintenance personnel.

The local communication network 106 (e.g., Wi-Fi network) is implemented aboard the aircraft 102 to provide communication services (e.g., Internet access, cellular calling capability, etc.) to the electronic devices 110 while the electronic devices 110 are aboard the aircraft 102 in-flight (and in some case pre- or post-flight). The local communication network 106 may provide communication services to the electronic devices 110 in response to requests initiated at the electronic devices 110, for example. Generally speaking, the communication network 106 may be a network or group of networks disposed, managed, and/or hosted on-board the aircraft 102. The communication network 106 may include various nodes and links used for data and/or communication exchange between the nodes. In an embodiment, nodes of the communication network 106 may also communicate with nodes outside of the communication network 106 (e.g., via the Internet 160). In an embodiment, the communication network 106 includes one or more access points that allow some or all of the electronic devices 110 to connect to the communication network 106. For example, the communication network 106 may include networking equipment such as routers, hubs, switches, repeaters, bridges, and/or gateway devices. Some of the networking equipment may utilize a spread spectrum paradigm and/or one or more RF bands (e.g., an ISM band, such as the 900 MHz band, 2.4 GHz band or 5 GHz band) to facilitate communication.

Although the communication links 130 are depicted as part of an ATG network and referred to herein in the singular tense, it should be appreciated that other network configurations are envisioned. For example, the communication links 130 may be a satellite-based communication link, etc. Furthermore, in some embodiments, multiple communication links 130 may be associated with the aircraft 102, e.g., the aircraft 102 may be communicatively connected to both ATG communication links 130 and satellite-based communication links (not shown). The communication links 130 may be collectively supported by a multiplicity of radio frequency (RF) bands. Typically, a particular frequency band or portion of RF spectrum supporting the communication links 130 is allocated (e.g., by a governmental or regulatory body) for a particular type of wireless communications such as satellite communications, ham-radio communications, terrestrial cellular communications, near-field wireless communications, or the like. In some allocated frequency bands, wireless communications may be transmitted over a forward link and a corresponding reverse link using a respective wireless communication protocol that is defined, designated or otherwise indicated by a standards association and/or by a government or other regulatory body. A particular frequency band may support a point-to-point wireless protocol and/or may support a broadband wireless protocol, for example.

Each of the communication links 130 may represent a tunnel (e.g., a UDP tunnel), as illustrated. Each of the tunnels may correspond to a certain communication protocol; for example, at least one of the tunnels may operate in accordance with a 4G communication protocol and at least one of the tunnels may operate in accordance with a 5G communication protocol. The tunnels may be formed, defined or allocated by frequency division, time division, code division, some other suitable channel division, or some combination of divisions. Signals that are carried on a tunnel may or may not be multiplexed. Any one or more tunnels included in a frequency band may support (or may be designated to support) a forward link and/or a reverse link for wireless communications. Additionally, any one or more of the tunnels included in a frequency band may be used to deliver signaling, data payload, or a combination of signaling and data payload. For example, a particular frequency band may support an in-band protocol in which signaling and payload are transmitted over the same tunnel within the band, and/or the particular frequency band may support an out-of-band protocol in which the signaling and payload are respectively transmitted over different tunnels within the band.

As previously discussed, the communication links 130 may connect the aircraft 102 and the terrestrial base station 140, via one or more tunnels, to the data center 150. As illustrated, the data center 150 includes a server 152, a deep packet inspection (DPI) engine 154, and an internet gateway 156. The system 100 is configured to deliver data or information to the electronic devices 110 on-board the aircraft 102 from the data center 150 or from the server 152 (e.g., Global Network Management Server, or "GNMS") included in the data center 150. In some implementations, the system 100 is configured to deliver feedback information from the aircraft 102 to the data center 150 or the server 152, and the data center 150 or the server 152 may use the feedback information to inform subsequent data delivery to the electronic devices 110. It should be understood that while the data center 150 is illustrated as including components of the server 152, DPI engine 154, and the internet gateway 156, one or more of the components may be located outside of the data center 150. For example, the internet gateway 156 may be located outside of the data center 150 while the server 152 and the DPI engine 154 are co-located within the data center 150. In some aspects, one or more of the components of the data center 150 may be omitted. In some aspects, the data center 150 may be omitted and one or more of the components of the server 152, DPI engine 154, and the internet gateway 156 may be physically independent while still communicatively coupled.

The server 152, included in the data center 150 of the system 100, may comprise, in an embodiment, a set of computer executable instructions that are stored on one or more non-transitory, tangible, computer-readable storage media (e.g., one or more memories or data storage entities), and that are executable by one or more processors of the data center 150 (the data center 150 generally includes one or more computing devices having processors). The server 152 may manage data or information delivery, e.g., over the communication links 130, to and from the aircraft 102. More specifically, the server 152 may be used in marking internal data packets transmitted to/from electronic devices 110 being transported aboard the aircraft 102 to indicate communication protocols corresponding to each packet to enable policy shaping in the system 100 with the aggregated network.

The DPI engine 154 included in the data center 150 may be communicatively coupled with the server 152. At a high level, deep packet inspection (DPI) is an advanced method of examining and managing network traffic. DPI methods are generally a form of packet filtering that locates, identifies, classifies and reroutes or blocks packets with specific data or code payloads that conventional packet filtering, which examines only packet headers, cannot detect. DPI methods may examine the contents of packets passing through a given checkpoint and make real-time decisions depending on either what a packet contains or based on rules assigned by an enterprise, an internet service provider, or a network manager. DPI methods may also be useful for network management and content policy enforcement such as stopping data leaks or streamlining or modifying flow of network traffic as per specific use cases (e.g., a message tagged as high-priority can be routed to its destination ahead of less important or lower-priority messages or packets). DPI methods may also be used to throttle data transfers to prevent peer-to-peer abuse and thus improve network performance. Compared to conventional packet filtering that can only read the header of each data packet that provides basic information about its sender, intended recipient, and the time it was sent, DPI methods enable extraction or filtration of information beyond packet headers for more proactive and advanced network monitoring and protection. As illustrated, the DPI engine 154 implements one or more techniques of DPI methods, and may read and interpret markings in internal data packets transmitted to/from electronic devices 110 being transported aboard the aircraft 102 to indicate communication protocols corresponding to each packet to enable policy shaping in the system 100 with the aggregated network. Furthermore, the DPI engine 154 may, based on the reading of the markings, apply various policies to the internal data packets of data streams.

The data center 150 may be communicatively connected via the internet gateway 156 to the Internet 160 (or possibly other networks, in some aspects). Generally, the internet gateway 156 may include one or more computing devices in communicative connection, and may serve as a boundary between the system 100 and the Internet 160. In some embodiments, at least some of the computing devices included in the internet gateway 156 may also be included in the data center 150. In alternative or in addition to the Internet 160, the internet gateway 156 may be in communicative connection with a PSTN (Public Switched Telephone Network), one or more other public networks, or one or more private networks. Although FIG. 1 illustrates the data center 150 being connected to the Internet 160 via the internet gateway 156, the techniques and principles described herein equally apply to the data center 150 having and/or being in communicative connection with any desired number of other networks other than the Internet 160 via any number of gateways. In some embodiments of the system 100, the internet gateway 156 may be omitted.

Exemplary System Using ECN Bit Markers

Figure 2A:
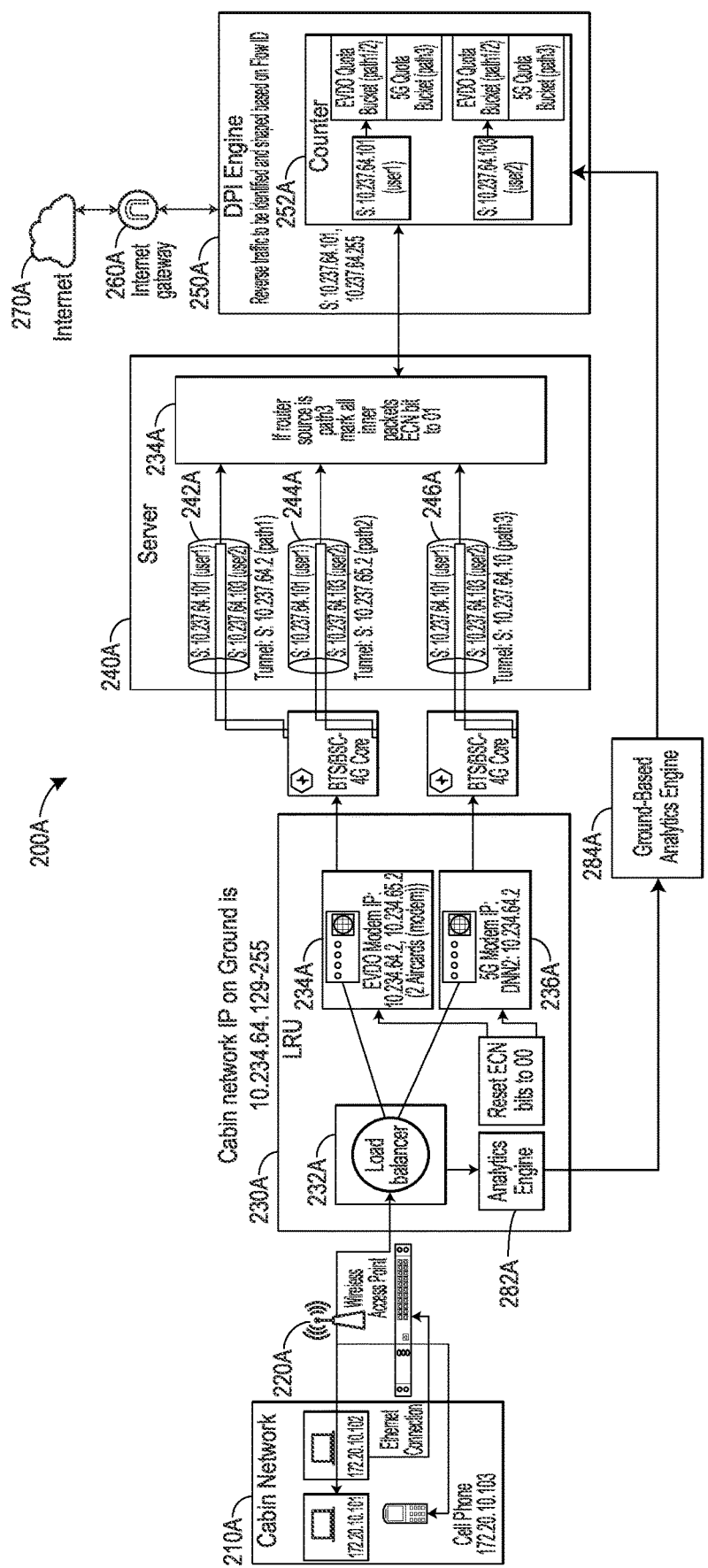
FIG. 2A illustrates an exemplary system for policy shaping using ECN bit markers in delivering data to and from devices that are on-board a vehicle over an aggregated network.

FIG. 2A illustrates an exemplary system 200A for using explicit congestion notification (ECN) bit markers for marking internal data packets of data streams delivered to and from devices that are on-board a vehicle over an aggregated network. At a high level, the system 200A utilizes the ECN bit of data streams to mark internal data packets transmitted to/from devices (e.g., the electronic devices 110, in response to one or more requests to deliver content to the electronic devices 110) being transported aboard an aircraft (e.g., the aircraft 102) to indicate communication protocols corresponding to each packet to enable policy shaping in an aggregated network.

ECN is an extension to the Internet Protocol and to the Transmission Control Protocol and is defined in RFC 3168 (2001). ECN notifies networks about congestion with the goal of reducing packet loss and delay by making the sending device decrease the transmission rate until the congestion clears, without dropping packets. ECN communicates whether or not congestion is experienced by marking the two least-significant bits in the differentiated services (DiffServ) field in the IP header. The most significant six bits in the DiffServ field contain the Differentiated Services Code Point (DSCP) bits. The two ECN bits in the DiffServ field provide four codes that determine if a packet is marked as an ECN-capable transport (ECT) packet, meaning that both endpoints of the transport protocol are ECN-capable, and if there is congestion experienced (CE). The ECN bit codes mean as follows: (00) means Non-ECT—Packet is marked as not ECN-capable; (01) means ECT(1)—Endpoints of the transport protocol are ECN-capable; (10) means ECT(0)—Endpoints of the transport protocol are ECN-capable; and (11) means CE—Congestion experienced. While these discussed ECN techniques are how ECN bits are conventionally used, in some aspects, present techniques may use the ECN bit not to indicate ECT or congestion, but as markers to indicate communication protocols corresponding to each packet to enable policy shaping.

The system 200A includes components of a cabin network 210A, a wireless access point 220A, a LRU 230A, a server 240A, a DPI engine 250A, an internet gateway 260A, and the Internet 270A. Various components or techniques of or associated with the system 200A may be the same as or similar to the components or techniques of or associated with the system 100.

The cabin network 210A of the system 200A may be the same as, or similar to, the communication network 106 of the system 100 and similarly may serve to provide communication services (e.g., Internet access, cellular calling capability, etc.) to electronic devices while the electronic devices are aboard an aircraft (e.g., the aircraft 102) in-flight (and in some case pre- or post-flight). As illustrated, the cabin network 210A includes the electronic devices (two laptops and one cell phone, as illustrated), which may be the same as or similar to the electronic devices 110 of the system 100. The electronic devices may be used for accessing media content, which may include audio and/or visual information.

The devices in the cabin network 210A are illustrated as being communicatively connected to the LRU 230A via the wireless access point 220A. The LRU 230A, which may be the same as or similar to the LRU 120 of the system 100, may be comprised of modular components that may be sealed units of an aircraft (e.g., the aircraft 102), which are designed to be replaced within a short time without using specialized tools enabling the aircraft to quickly return to service, while LRU 230A is being tested and repaired. As illustrated, a load balancer 232A and modems 234A and 236A are included in the LRU 230A.

The load balancer 232A can reduce network congestion by preventing overload of high-performing communication links. To determine idle capacity, the load balancer 232A may first determine a bandwidth estimate for the communication link. In some embodiments, the bandwidth estimate may be inferred based on a measured characteristic of the communication link (e.g., SNR, CNR, Tx Power, Rx Power, RSSI, etc.). Generally speaking, the higher quality the measured characteristics are, the more bandwidth the communication link may support. Additionally, the load balancer 232A may determine an amount of traffic scheduled to be routed over the communication link. To this end, a network may route all traffic to the load balancer 232A. The load balancer 232A may then assign traffic between one or more queues based on a traffic scheduling scheme. For example, higher priority traffic may be routed to a first queue, whereas lower priority traffic may be routed to a second queue. Based on the amount of traffic in a queue, the load balancer 232A can determine an amount of traffic that is scheduled for each communication link. While a load balancer that is the same as or similar to the load balancer 232A is not illustrated as being included in the system 100, in some aspects, a load balancer that is the same as or similar to the load balancer 232A is included in the system 100, such as in the LRU 120.

The modems 234A and 236A which may be the same as or similar to the modems 122 of the system 100, may operate over one or more frequency bands and may enable receiving or transmitting data from an aircraft (e.g., the aircraft 102). As illustrated, the modem 234A is an EVDO (evolution-data optimized, also known as 4G) modem and the modem 236A is a 5G modem. The data streams flowing through the modem 234A is referred to in FIG. 2A as "path 1" or "path 2" and the data streams flowing through the modem 236A is referred to in FIG. 2A as "path 3." As further illustrated with respect to the modems 234A and 236A, to implement marking of the ECN bit of data streams of internal data packets transmitted to/from electronic devices being transported aboard an aircraft, the ECN bits of the data streams flowing through the modems 234A and 236A are reset to 00.

The LRU 230A is illustrated as being communicatively connected to the server 240A. The server 240A, which may be the same as or similar to the server 152 of the system 100, may manage data or information delivery, e.g., over communication links (e.g., the links 130), to and from an aircraft (e.g., the aircraft 102). The server 240A may include tunnels 242A-246A. As illustrated, the data streams flowing through path 1 passes through tunnel 242A, the data streams flowing through path 2 passes through tunnel 244A, and the data streams flowing through path 3 passes through tunnel 246A. With each tunnel corresponding to either the modem 234A or the modem 236A, if performance of one of the two modems 234A or 236A degrades (or goes out of operation entirely), the tunnel may move (e.g., via the load balancer 232A, via the modems 234A or 236A, etc.) to the other modem. As further illustrated, the server 240A may mark inner packets of the user data to indicate the particular path data streams is flowing through. With this technique, inner packets for data streams flowing through path 3 will be marked with an ECN bit of (01). In overriding the usage of the already-existing ECN bit to indicate paths for data streams, minimal changes may have to be made for legacy product (e.g., software, hardware, standard operating procedures, etc.). Of course the illustrated example of changing the ECN bit for data streams on path 3 to (01) is merely exemplary; it should be understood that the ECN bits may be changed to any of (00), (01), (10), or (11) to indicate any type of path corresponding to any type of communication protocol. For example, in some embodiments, data streams corresponding to 5G may be marked with an ECN bit of (11) while data streams corresponding to 4G may be marked with an ECN bit of (10).

The server 240A is illustrated as being communicatively connected to the DPI engine 250A. The DPI engine 250A, which may be the same as or similar to the DPI engine 154 of the system 100, may (i) read and interpret markings (ECN bit markings, as illustrated in FIG. 2A) in internal data packets to indicate communication protocols corresponding to each packet to enable policy shaping, and (ii) based on the reading of the markings, apply various policies to the internal data packets of data streams. With the illustrated embodiment of the ECN bits of data streams corresponding to path 3 being marked as (01), the DPI engine 250A will interpret that data streams with ECN bits marked as (01) are coming on the 5G physical link. Using this unique identification method, the DPI engine 250A will apply different policies for data streams depending on which physical path the data streams belongs to. It should be understood that there are many different types of policies that could be applied to data streams depending on the communication protocol corresponding to the data streams; however one exemplary set of policies are included in Table 1. As shown in Table 1, policies applied to data streams may be dependent on data size (e.g., number of bytes of a given user's data streams, number of bytes of a group of user's data streams, etc.). Accordingly, a counter 252A may be implemented in the DPI engine 250A in order to determine a count corresponding to data sizes for data streams and enable limiting a user's bandwidth by capping data streams based on the communication protocol corresponding to the data streams of the user.

TABLE 1

| Sample Policy on 4G | Sample Policy on 5G: |
| --- | --- |
| Protocol X: 100 Bytes in 1 hour (then block) | Protocol X: 2000 Bytes in 1 hour (then block) |
| Protocol Y: 100 Bytes in 1 hour (then shape) | Protocol Y: 2000 Bytes in 1 hour (then shape) |
| Protocol Z: Block | Protocol Z: 2000 Bytes in 1 hour (then shape) |

The DPI engine 250A is illustrated as being communicatively connected to the internet gateway 260A. The internet gateway 260A, which may be the same as or similar to the internet gateway 156 of the system 100, may include one or more computing devices in communicative connection, and may serve as a boundary between the system 100 and the Internet 270A (which may be the same as or similar to the Internet 160 of the system 100). In alternative or in addition to the Internet 270A, the internet gateway 260A may be in communicative connection with a PSTN (Public Switched Telephone Network), one or more other public networks, or one or more private networks. In some embodiments of the system 100, the internet gateway 260A may be omitted.

In some embodiments, the system 200A may further include an analytics engine or component 282A, e.g., within the LRU 230A. The analytics engine or component 282A may be configured to collect and/or analyze network performance characteristics, location attributes, and/or other data associated with operation of the system 200A. In some embodiments, the analytics engine or component 282A may be configured to provide the network performance characteristics, location attributes, and/or other data via one or more modems to a ground-based analytics engine 284A, which may be configured to collect and analyze the network performance characteristics, location attributes, and/or other data in a manner that will be described in subsequent portions of the present description. Generally speaking, output of the ground-based analytics engine may be utilized to assist in policy shaping by the DPI engine 250A (e.g., output of the ground-based analytics system 284A may be provided to the DPI engine 250A to be used as a factor in selecting a policy).

Exemplary System Using IP Options Message Markers

Figure 2B:
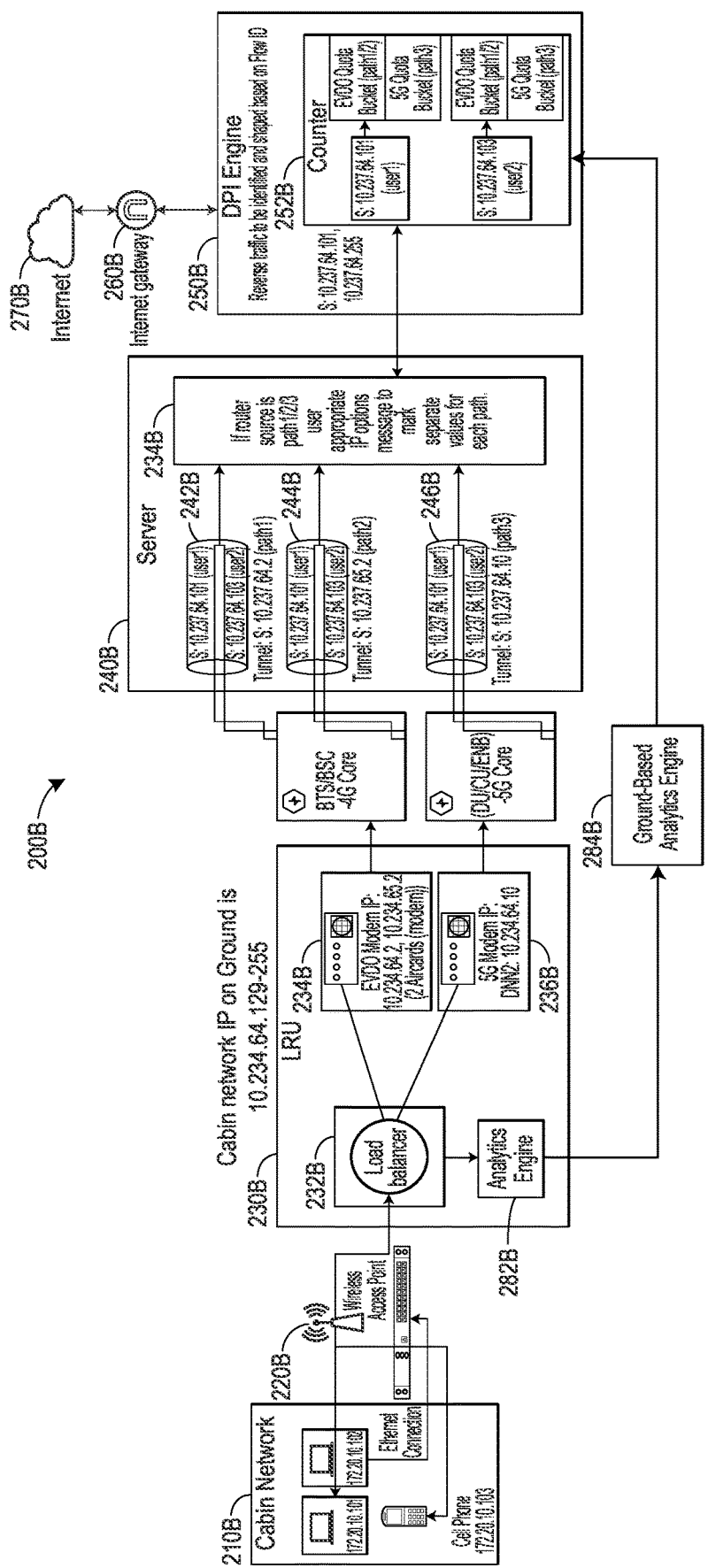
FIG. 2B illustrates an exemplary system for policy shaping using IP options message markers in delivering data to and from devices that are on-board a vehicle over an aggregated network.

FIG. 2B illustrates an exemplary system 200B for using internet protocol (IP) options message markers for marking internal data packets of data streams delivered to and from devices that are on-board a vehicle over an aggregated network. At a high level, the system 200B utilizes the IP options messages of data streams to mark internal data packets transmitted to/from devices (e.g., the electronic devices 110) being transported aboard an aircraft (e.g., the aircraft 102) to indicate communication protocols corresponding to each packet to enable policy shaping in an aggregated network.

At a high level, an IP header is header information at the beginning of an IP packet. IP packets are conventionally the smallest message entities exchanged across an IP network and may include a header for addressing and routing, and a payload for user data. The header may include information about IP version, source IP address, destination IP address, time-to-live, etc. The payload of an IP packet may include a datagram or segment of the higher-level transport layer protocol, but may be data for an internet layer (e.g., ICMP or ICMPv6) or link layer (e.g., OSPF) instead. Two different versions of IP are used in practice today: IPv4 and IPV6. The IPV6 header uses IPv6 addresses and thus offers a much bigger address space but is not backward compatible with IPv4. The header of an IP datagram is often made up of a fixed part and a variable part. For IPV4, for example, the fixed part is 20 bytes and the options field in the IPv4 header is 40 bytes. While these discussed IP options fields may be used conventionally in some examples for recording IP addresses, present techniques may use the IP options message for including markers to indicate communication protocols corresponding to each packet to enable policy shaping.

The system 200B includes components of a cabin network 210B, a wireless access point 220B, a LRU 230B, a server 240B, a DPI engine 250B, an internet gateway 260B, and the Internet 270B, one or more of which may respectively be the same as or similar to the cabin network 210A, the wireless access point 220A, the LRU 230A, the server 240A, the DPI engine 250A, the internet gateway 260A, and the Internet 270A of system 200A. Various components or techniques of or associated with the system 200B may be the same as or similar to the components or techniques of or associated with the system 100 or the system 200A.

While the system 200B has numerous similarities to the system 200A, the system 200B represents an exemplary embodiment where, instead of using the ECN bit to mark internal data packets based on their respective communication protocol, the system 200B marks the IP options messages. Similarly as described with respect to the system 200A, the server 240B may be used to mark separate values in the IP options message that are each unique to different paths (path 1, path 2, and path 3, as illustrated). Based on the markings in the IP options messages of internal data packets of data streams, the DPI engine 250B may differentiate between paths for the data streams, and, using a counter 252B (which may be the same as or similar to the counter 252A), may apply various policies to the data streams based on the communication protocols corresponding to the data streams. For example, the DPI engine 250B may, based on the IP options message of a particular data stream, identify the particular data stream as corresponding to path 1 and accordingly the 4G communication protocol. Based on a count corresponding to the data size of the particular data stream determined by an EVDO Quota Bucket included in the counter 252B, the DPI engine 250B may apply Policy Z of Table 1 and block the particular data stream.

In some embodiments, similarly to the system 200A of FIG. 2A, the system 200B may further include an analytics engine or component 282B, e.g., within the LRU 230B. The analytics engine or component 282B may be configured to collect and/or analyze network performance characteristics, location attributes, and/or other data associated with operation of the system 200B. In some embodiments, the analytics engine or component 282B may be configured to provide the network performance characteristics, location attributes, and/or other data via one or more modems to a ground-based analytics engine 284B, which may be configured to collect and analyze the network performance characteristics, location attributes, and/or other data in a manner that will be described in subsequent portions of the present description. Generally speaking, output of the ground-based analytics engine may be utilized to assist in policy shaping by the DPI engine 250B (e.g., output of the ground-based analytics system 284B may be provided to the DPI engine 250B to be used as a factor in selecting a policy).

Exemplary System Using VLAN Classifiers

Figure 2C:
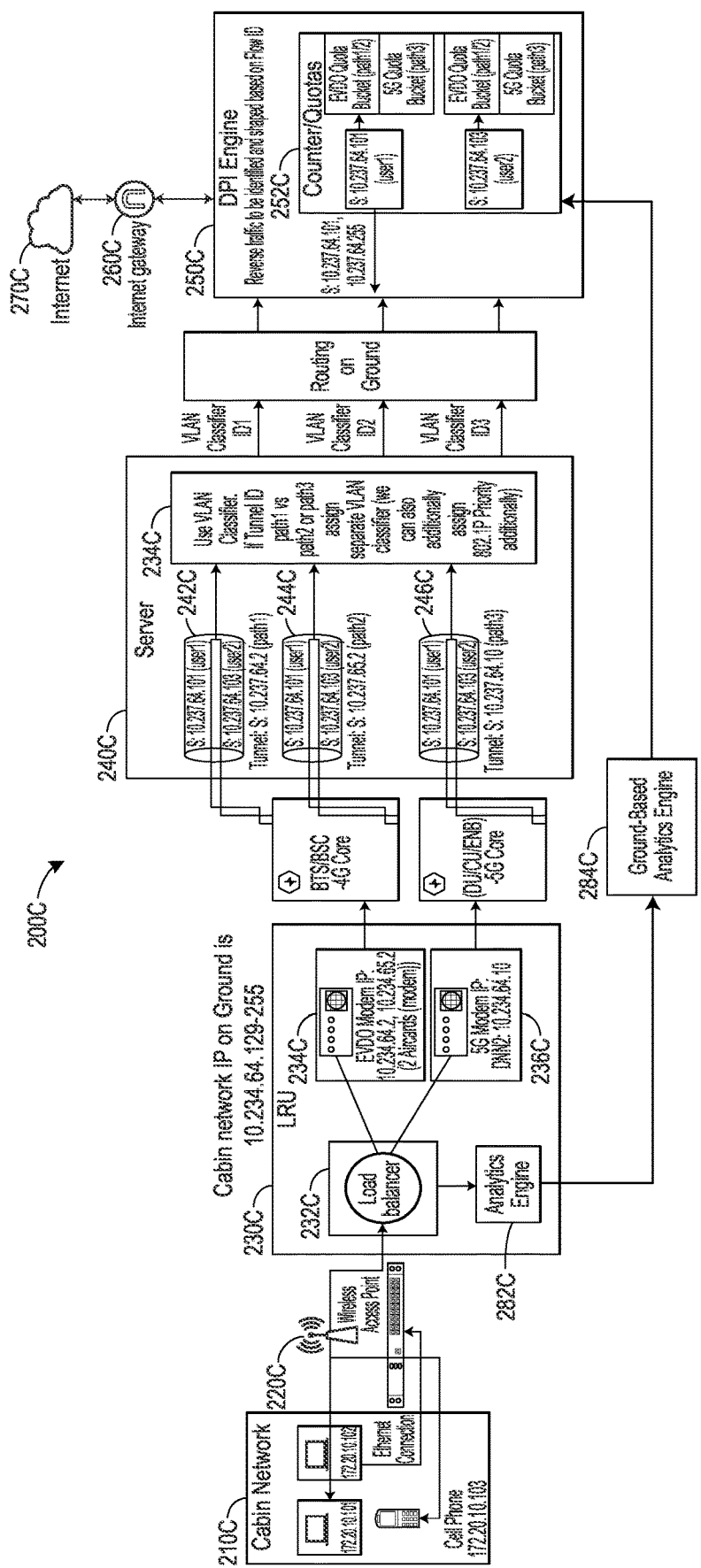
FIG. 2C illustrates an exemplary system for policy shaping using VLAN classifiers in delivering data to and from devices that are on-board a vehicle over an aggregated network.

FIG. 2C illustrates an exemplary system 200C for using IP options message markers for marking internal data packets of data streams delivered to and from devices that are on-board a vehicle over an aggregated network. At a high level, the system 200C utilizes separate virtual local area network (VLAN) classifiers to segregate (e.g., via marking) internal data packets transmitted to/from devices (e.g., the electronic devices 110) being transported aboard an aircraft (e.g., the aircraft 102) based on communication protocols corresponding to each packet to enable policy shaping in an aggregated network.

The system 200C includes components of a cabin network 210C, a wireless access point 220C, a LRU 230C, a server 240C, a DPI engine 250C, an internet gateway 260C, and the Internet 270C, one or more of which may respectively be the same as or similar to the cabin network 210A/B, the wireless access point 220A/B, the LRU 230A/B, the server 240A/B, the DPI engine 250A/B, the internet gateway 260A/B, and the Internet 270A/B of the system 200A/B. Various components or techniques of or associated with the system 200C may be the same as or similar to the components or techniques of or associated with the system 100 or the system 200A/B.

While the system 200C has numerous similarities to the system 200A/B, the system 200C represents an exemplary embodiment where, instead of using either the ECN bit or the IP options message to mark internal data packets based on their respective communication protocol, the system 200C utilizes separate virtual local area network (VLAN) classifiers to segregate (e.g., via marking) internal data packets. Similarly as described with respect to the system 200A/B, the server 240C may be used to implement multiple VLAN classifiers that are each unique to different paths (path 1, path 2, and path 3, as illustrated). Based on the VLAN classifiers corresponding to the data streams, the DPI engine 250C may differentiate between paths for the data streams, and, using a counter 252C (which may be the same as or similar to the counter 252A/B), may apply various policies to the data streams based on the communication protocols corresponding to the data streams. For example, the DPI engine 250C may, based on the VLAN classifier corresponding to a particular data stream, identify the particular data stream as corresponding to path 3 and accordingly the 5G communication protocol. Based on a count corresponding to the data size of the particular data stream determined by a 5G Quota Bucket included in the counter 252C, the DPI engine 250C may apply Policy X of Table 1 and allow 2000 bytes of the particular user data in 1 hour and then block the particular data stream.

In some embodiments, similarly to the system 200A of FIG. 2A and/or the system 200B of FIG. 2B the system 200C may further include an analytics engine or component 282C, e.g., within the LRU 230C. The analytics engine or component 282C may be configured to collect and/or analyze network performance characteristics, location attributes, and/or other data associated with operation of the system 200C. In some embodiments, the analytics engine or component 282C may be configured to provide the network performance characteristics, location attributes, and/or other data via one or more modems to a ground-based analytics engine 284C, which may be configured to collect and analyze the network performance characteristics, location attributes, and/or other data in a manner that will be described in the subsequent portion of the present description. Generally speaking, output of the ground-based analytics engine may be utilized to assist in policy shaping by the DPI engine 250C (e.g., output of the ground-based analytics system 284B may be provided to the DPI engine 250C to be used as a factor in selecting a policy).

Example System Using Other Network Performance Parameters to Select/Apply Policy Additionally or alternatively to selecting and applying network policies based on the communication protocols associated with vehicles and on-board devices (e.g., communication protocols of reverse link requests from on-board devices, as described in the foregoing sections), the systems and methods of the present disclosure may select/apply network policies based on still other network performance parameters.

In particular, a ground-based analytics system may collect real-time or near real-time network performance characteristics, location attributes and/or other data associated with communications between the vehicles/on-board devices and the ground-based network. Referring to FIG. 1, the ground-based analytics system may be located, for example, within the data center 150 of FIG. 1 (e.g., within the server 152) and/or in another one or more servers (e.g., one or more cloud servers). The ground-based analytics engine may collect the network performance characteristics, location attributes and/or other data, for example, from the line replaceable unit (LRU) 120 on-board each aircraft 102, and/or by directly measuring or observing the network performance characteristics data and/or location attributes via the ground-based analytics engine or other aspects of the ground-based system. Network performance characteristics for each respective aircraft 102 may include, for example, reverse link communication volume, usage rate, and/or expected throughput from the aircraft 102, forward link communication volume, usage rate, and/or expected throughput from the ground to the aircraft 102, reverse link and/or forward link communication latency, forward link and/or reverse link bandwidth, reverse link and/or forward link packet loss, and/or respective usage of each of one or more modems on-board the aircraft 102 (e.g., two or more modems 122 implementing different respective data tunnels using different respective communication protocols, for example according to the techniques in the foregoing sections of this disclosure).

Based on the collected information associated with communications involving each respective aircraft 102, the ground-based analytics system may calculate an estimate of aggregate network performance for each respective aircraft 102. In embodiments, the aggregate network performance may generally correlate to quality of service (QOS) experienced by each of the on-board devices on each aircraft 102. In some embodiments, the aggregate network performance is an instantaneous aggregate network performance, e.g., based on real-time, instantaneous network performance characteristics. Alternatively, the aggregate network performance is based on a moving average of the network performance characteristics and/or other data, e.g., from a rolling time window corresponding to a period of time prior to the estimating of the aggregate network performance.

Based on the estimated aggregate network performance for each respective aircraft 102, the ground-based analytics system may dynamically apply a network policy for each respective aircraft 102. In embodiments, for each respective aircraft 102, the ground-based analytics system may repeatedly or continuously re-calculate the respective aggregate network performance, and may dynamically modify the network policy for the respective aircraft 102 each time the ground-based analytics system determines that the aggregate network performance exceeds the existing (previous) estimate for the same aircraft 102 (e.g., via the DPI engine 154 of FIG. 1).

In embodiments, different pools of network policies may be established for respective communication protocols potentially used by each aircraft 102 (e.g., the communication protocols described with respect to the foregoing features, each of which may use a different modem and/or data tunnel from communications corresponding to other communication protocols). For example, for a first aircraft from which communications utilize a first communication protocol, the ground-based analytics system may select a network policy for the first aircraft from a first set of network policies. For a second aircraft from which communications utilize a second communication protocol different from the first communication protocol, the ground-based analytics system may select a network policy for the first aircraft from a second set of network policies, the second set of network policies being partly or entirely different from the first set of network policies. In embodiments, selection of the network policy for each respective aircraft 102 may be based at least in part upon the relative locations of each respective aircraft 102 and the respective ATG towers/other infrastructure serving the respective aircraft 102, to thereby account for changes in performance characteristics due to geographical attributes.

Exemplary Method Using ECN Bit Markers

Figure 3A:
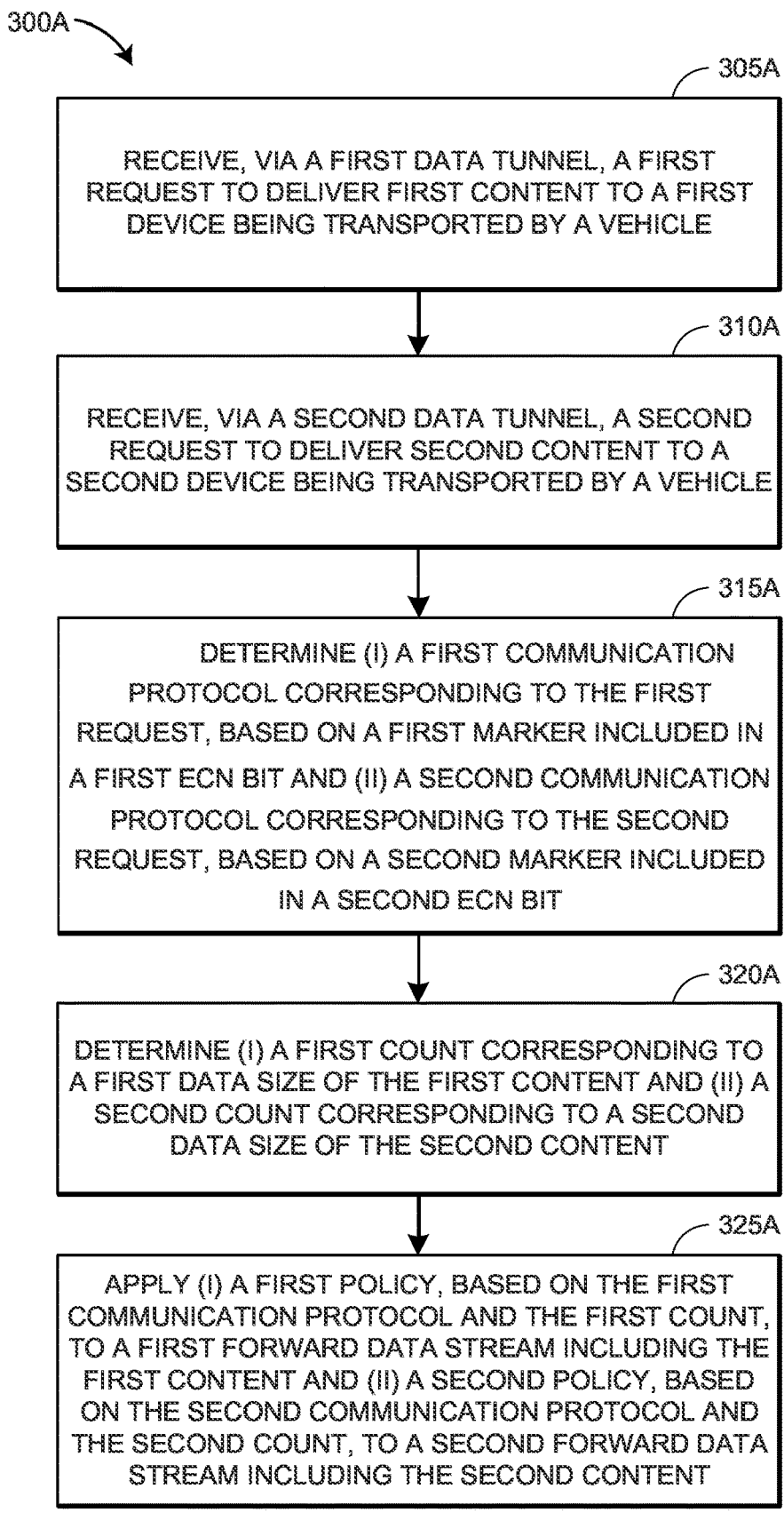
FIG. 3A is a flow diagram depicting an exemplary method for policy shaping, using ECN bit markers, in delivery of data to and from devices that are on-board a vehicle over an aggregated network.

FIG. 3A illustrates an example method 300A for providing communications to and from a device being transported by a vehicle. In an embodiment, the method 300A is performed at least in part by one or more of the system 100 of FIG. 1, the system 200A, the system 200B, or the system 200C. More specifically, in an embodiment, at least a portion of the method 300A may be performed by one or more of the data center 150, by the server 240A/B/C, or the DPI engine 250A/B/C. For ease of discussion, the method 300A is described below with simultaneous reference to the system 100 of FIG. 1, however, this is only one of many embodiments and is understood to be non-limiting. The example method 300A may include one or more of the following elements: (1) receiving, via a first data tunnel, a first request to deliver first content to a first device being transported by a vehicle (block 305A), (2) receiving, via a second data tunnel, a second request to deliver second content to a second device being transported by a vehicle (block 310A), (3) determining (i) a first communication protocol corresponding to the first request, based on a first marker included in a first ECN bit and (ii) a second communication protocol corresponding to the second request, based on a second marker included in a second ECN bit (block 315A), (4) determining (i) a first count corresponding to a first data size of the first content and (ii) a second count corresponding to a second data size of the second content (block 320A), and/or (5) applying (i) a first policy, based on the first communication protocol and the first count, to a first forward data stream including the first content and (ii) a second policy, based on the second communication protocol and the second count, to a second forward data stream including the second content (block 325A).

As previously discussed, the recipient device of the data or information included in the communications may be a computing device that is fixedly connected to a vehicle (e.g., a component/device that is included in the LRU 120 on the aircraft 102), or the device may be a mobile computing device such as a smart phone, tablet or laptop computing device that is temporarily being transported by the vehicle (e.g., the aircraft). In fact, the device may be any device connected to any on-board communication network that is communicatively connected to the on-board node via which data is received onto the vehicle and/or delivered from the vehicle. For ease of discussion, though, and not for limitation purposes, the method 300A is described below in the context of an example scenario in which the device is being transported by the vehicle.

Block 305A may include receiving (e.g., at the data center 150, or, more specifically, the server 152 or the DPI engine 154) via the first data tunnel of a plurality of data tunnels that are communicatively connected to a plurality of devices (e.g., the electronic devices 110) that are being transported by the vehicle, the first request to deliver the first content to the first one or more devices of the plurality of devices being transported by the vehicle. The first data tunnel may enable the first device to transmit the first request and to receive a first data stream that includes the first content. The first tunnel may utilize a first modem (e.g., one of the modems 122). The first request may be generated in response to user input provided to the first device by a user of the first device, or by some other suitable means. The first content may include media content, which may include audio and/or visual information.

Block 310A may include receiving (e.g., at the data center 150, or, more specifically, the server 152 or the DPI engine 154) via the second data tunnel of the plurality of data tunnels that are communicatively connected to the plurality of devices that are being transported by the vehicle, the second request to deliver the second content to the second one or more devices of the plurality of devices being transported by the vehicle. The second data tunnel may enable the second device to transmit the second request and to receive a second data stream that includes the second content. The second tunnel may utilize a second modem (e.g., one of the modems 122). The second request may be generated in response to user input provided to the second device by a user of the second device, or by some other suitable means. The second content may include media content, which may include audio and/or visual information. In some aspects, the second content may be a different type of content than the first content. For example, the first content may include e-mail messages that may be of a lower data size than the second content that includes video. In this example where the second content is of a larger data size than the first content, the second modem of the second tunnel may correspond to a second communication protocol with a higher throughput than a first communication protocol corresponding to the first modem of the first tunnel.

Block 315A may include determining (e.g., at the data center 150, or, more specifically, the server 152 or the DPI engine 154) (i) the first communication protocol corresponding to the first request and (ii) the second communication protocol corresponding to the second request. In some aspects, the first and second communication protocols may be telecommunication standards. For example, the first communication protocol may be 4G (EVDO) and the second communication protocol may be 5G. More specifically, in some aspects, (i) the first communication protocol is determined to correspond to the first request based on a first marker included in a first ECN bit of the first request, and (ii) the second communication protocol is determined to correspond to the second request based on a second marker included in a second ECN bit of the second request. The DPI engine 250A, which may be the same as or similar to the DPI engine 154 of the system 100, may read and interpret ECN bit markings in internal data packets to determine communication protocols corresponding to each packet. For example, as illustrated with respect to the system 200A, an ECN bit marking of (01) in internal packets indicates 5G, whereas an ECN bit marking of (00) indicates 4G.

Block 320A may include determining (e.g., at the data center 150, or, more specifically, the server 152 or the DPI engine 154) (i) a first count corresponding to a first data size of the first content and (ii) a second count corresponding to a second data size of the second content. A counter such as the counter 252A may be implemented to determine the first count and the second count. The counter may determine the first count and the second count in order to enable limiting bandwidth of the first data stream including the first content and the second data stream including the second content according to various policies.

Block 325A may include applying (e.g., at the data center 150, or, more specifically, the server 152 or the DPI engine 154) (i) the first policy, based on the first communication protocol and the first count, to the first forward data stream to be sent to the vehicle, wherein the first forward data stream includes the first content and (ii) the second policy, based on the second communication protocol and the second count, to the second forward data stream to be sent to the vehicle, wherein the second forward data stream includes the second content. It should be appreciated that there are many different types of policies that could be applied to data streams depending on the communication protocol corresponding to the data streams; however one exemplary set of policies are included in Table 1. Referring to the example wherein both the first data tunnel and the first communication protocol correspond to a 4G protocol and both the second data tunnel and the second communication protocol correspond to a 5G protocol, a first throughput limit of the first policy may be lower than a second throughput limit of the second policy. In this example, the first count may be lower than the second count, due to the first data size of the first content being smaller than the second data size of the second content (e.g., the first content is a song, the second content is a music video).

Exemplary Method Using IP Options Markers

Figure 3B:
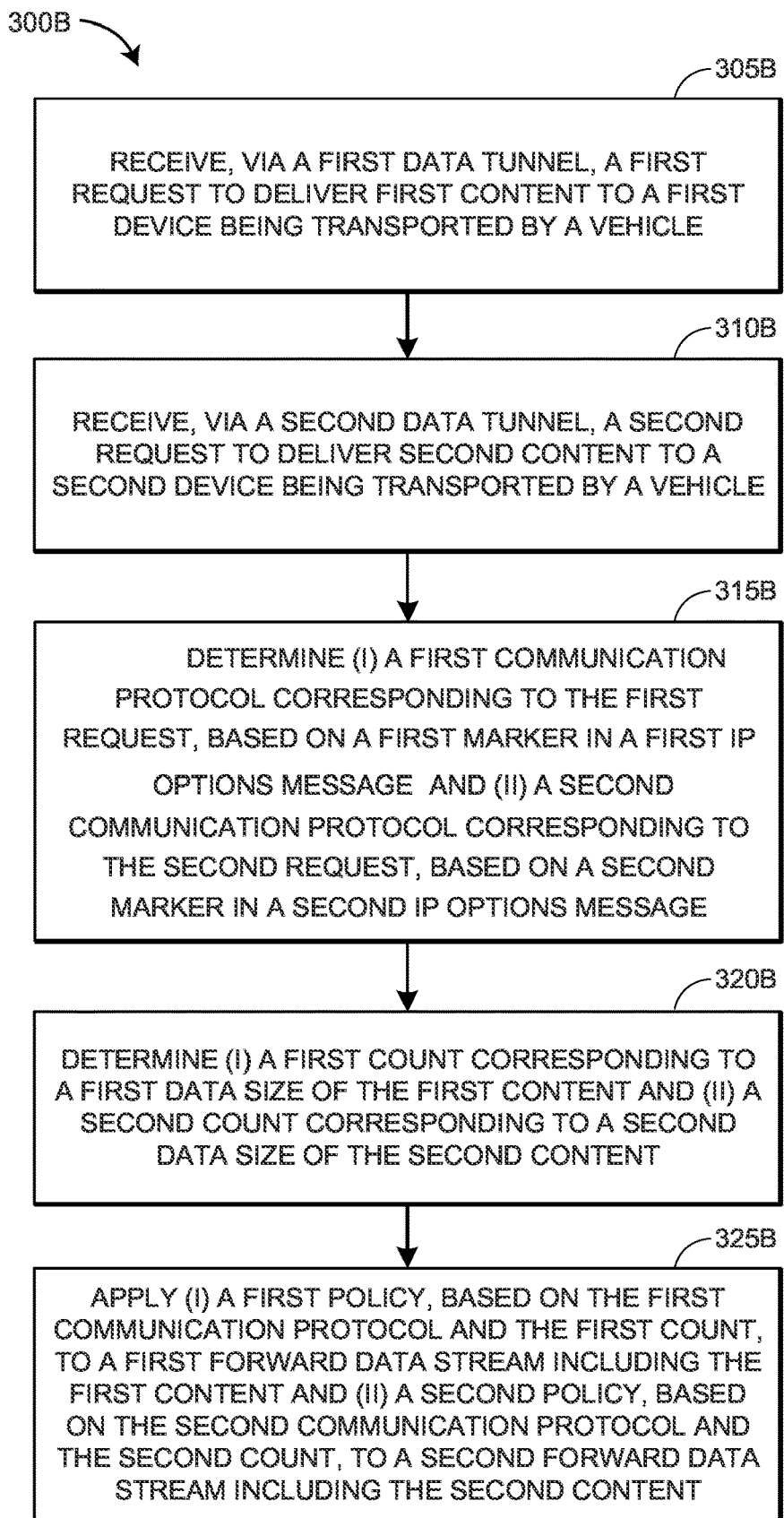
FIG. 3B is a flow diagram depicting an exemplary method for policy shaping, using IP options message markers, in delivery of data to and from devices that are on-board a vehicle over an aggregated network.

FIG. 3B illustrates an example method 300B for providing communications to and from a device being transported by a vehicle. In an embodiment, the method 300B is performed at least in part by one or more of the system 100 of FIG. 1, the system 200A, the system 200B, or the system 200C. More specifically, in an embodiment, at least a portion of the method 300B may be performed by one or more of the data center 150, by the server 240A/B/C, or the DPI engine 250A/B/C. For ease of discussion, the method 300B is described below with simultaneous reference to the system 100 of FIG. 1, however, this is only one of many embodiments and is understood to be non-limiting. The example method 300B may include one or more of the following elements: (1) receiving, via a first data tunnel, a first request to deliver first content to a first device being transported by a vehicle (block 305B), (2) receiving, via a second data tunnel, a second request to deliver second content to a second device being transported by a vehicle (block 310B), (3) determining (i) a first communication protocol corresponding to the first request, based on a first marker included in a first IP options message and (ii) a second communication protocol corresponding to the second request, based on a second marker included in a second IP options message (block 315B), (4) determining (i) a first count corresponding to a first data size of the first content and (ii) a second count corresponding to a second data size of the second content (block 320B), and/or (5) applying (i) a first policy, based on the first communication protocol and the first count, to a first forward data stream including the first content and (ii) a second policy, based on the second communication protocol and the second count, to a second forward data stream including the second content (block 325B).

One or more of block 305B, block 310B, block 315B, block 320B, and block 325B may be similar to or equivalent to each of block 305A, block 310A, block 315A, block 320A, and block 325A, respectively. However, in some aspects, the method 300B utilizes IP options messages of data streams (rather than ECN bits, as done in the method 300A) to mark internal data packets transmitted to/from devices (e.g., the electronic devices 110) being transported aboard a vehicle (e.g., the aircraft 102) to indicate communication protocols corresponding to each packet to enable policy shaping in an aggregated network. More specifically, the DPI engine 250B, which may be the same as or similar to the DPI engine 154 of the system 100, may read and interpret IP options messages, which include markers to indicate communication protocols corresponding to each packet, to determine communication protocols corresponding to each packet.

Exemplary Method Using VLAN Classifiers

Figure 3C:
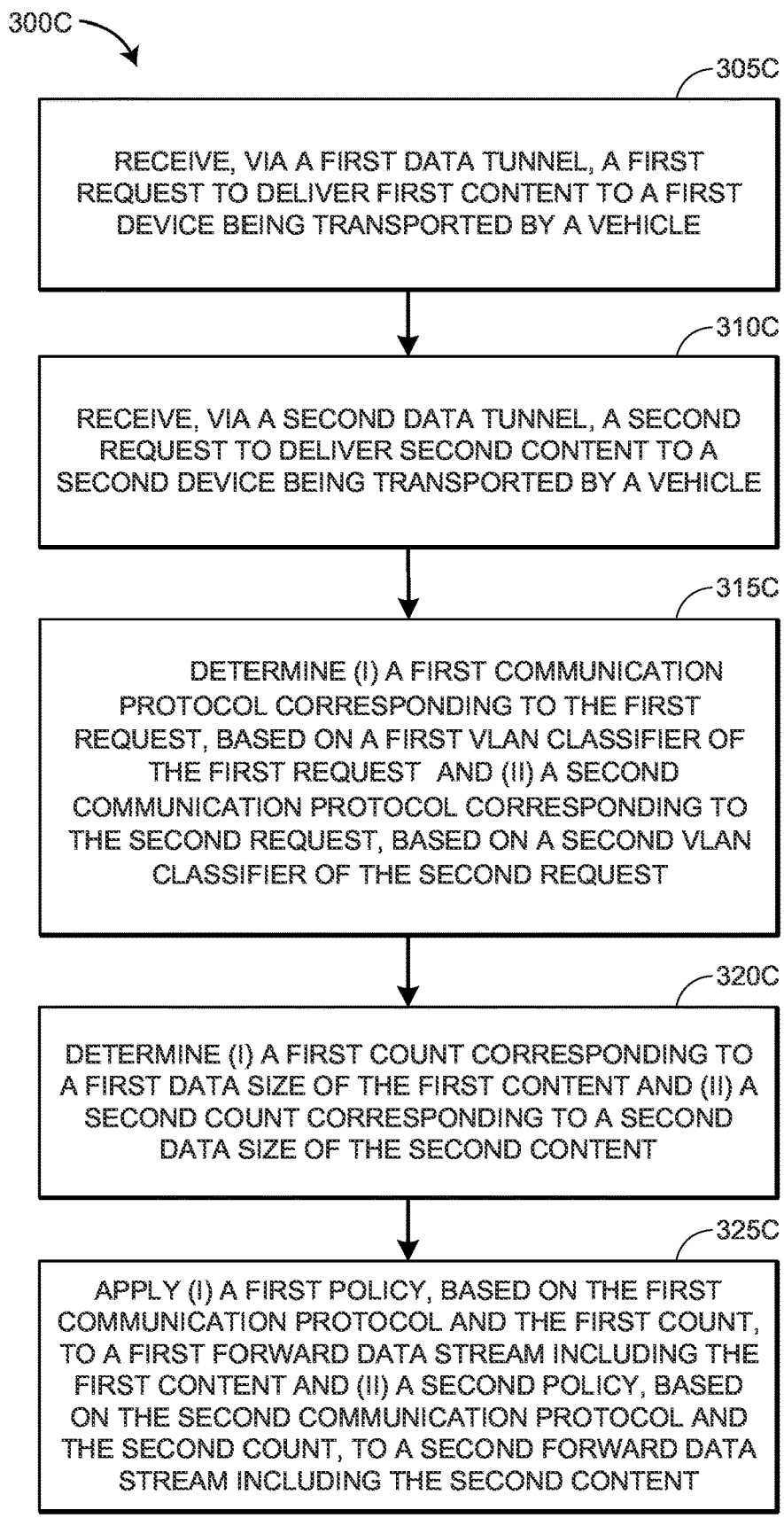
FIG. 3C is a flow diagram depicting an exemplary method for policy shaping, using VLAN classifier markers, in delivery of data to and from devices that are on-board a vehicle over an aggregated network.

FIG. 3C illustrates an example method 300C for providing communications to and from a device being transported by a vehicle. In an embodiment, the method 300C is performed at least in part by one or more of the system 100 of FIG. 1, the system 200A, the system 200B, or the system 200C. More specifically, in an embodiment, at least a portion of the method 300C may be performed by one or more of the data center 150, by the server 240A/B/C, or the DPI engine 250A/B/C. For ease of discussion, the method 300C is described below with simultaneous reference to the system 100 of FIG. 1, however, this is only one of many embodiments and is understood to be non-limiting. The example method 300C may include one or more of the following elements: (1) receiving, via a first data tunnel, a first request to deliver first content to a first device being transported by a vehicle (block 305C), (2) receiving, via a second data tunnel, a second request to deliver second content to a second device being transported by a vehicle (block 310C), (3) determining (i) a first communication protocol corresponding to the first request, based on a first VLAN classifier of the first request and (ii) a second communication protocol corresponding to the second request, based on a second VLAN classifier of the second request (block 315C), (4) determining (i) a first count corresponding to a first data size of the first content and (ii) a second count corresponding to a second data size of the second content (block 320C), and/or (5) applying (i) a first policy, based on the first communication protocol and the first count, to a first forward data stream including the first content and (ii) a second policy, based on the second communication protocol and the second count, to a second forward data stream including the second content (block 325C).

One or more of block 305C, block 310C, block 315C, block 320C, and block 325C may be similar to or equivalent to each of block 305A/B, block 310A/B, block 315A/B, block 320A/B, and block 325A/B, respectively. However, in some aspects, the method 300C utilizes VLAN classifiers options messages of data streams (rather than ECN bits or IP options messages, as done in the method 300A/B) to differentiate between communication protocols of internal data packets transmitted to/from devices (e.g., the electronic devices 110) being transported aboard a vehicle (e.g., the aircraft 102). The VLAN classifiers may each be unique to different paths. Accordingly, the DPI engine 250B, which may be the same as or similar to the DPI engine 154 of the system 100, may differentiate between the communication protocols corresponding to each of the data streams based on separate VLAN classifiers to segregate (e.g., via marking) internal data packets.

Any or all of the method 300A/B/C may be executed while the vehicle (e.g., the aircraft 102) is in any state that indicates a dynamic movement of the vehicle, or that indicates that the vehicle is en route or between an origination and a destination. For example, the vehicle may be an aircraft, and at least a portion of the method 300A/B/C may be executed while the vehicle is in any one of a plurality of flight states, e.g., in-flight, climbing, descending, weight-on-wheels, or any one of a plurality of possible port states. With regard to "port states," generally, as used herein, a "port" may be a designated location from which vehicles may depart and at which vehicles may arrive. Examples of ports may include airports, shipping ports, railroad stations, hospitals, shipping terminals, bus terminals, fueling stations, vehicle maintenance or service areas, military bases, aircraft carriers, and the like. As such, a "port state" of a vehicle, as used herein, generally refers to a vehicle state indicating that the vehicle is in the vicinity of (or proximate to) a vehicle port, e.g., the vehicle is taking-off, landing, taxiing, parked, docked, in the harbor, in the freight yard, etc. A port state may indicate that the vehicle is stationary or is not stationary. A port state may be determined, for example, by determining that the vehicle is within a certain distance of a port, e.g., by using a geo-spatial location of the vehicle (e.g., as determined by a Global Positioning System), and/or by detecting the presence and/or a signal strength of a beacon signal that is transmitted by a transceiver of the port. Of course, vehicles that are not aircraft may nonetheless have the ability to be in a port state, e.g., when a boat is within a harbor or docked at a port, when a truck is at a gas station or weigh station, or any time when a vehicle is not traveling en route between ports. In an embodiment, the entirety of the method 300A/B/C is executed while the vehicle is in a port state. In an embodiment, the entirety of method 300A/B/C is executed while the vehicle is in a dynamic movement state (e.g., in-flight, sailing, or moving along a highway). In an embodiment, the entirety of the method 300A/B/C is executed while the vehicle is in a stationary state (e.g., parked at a gate, stopped at a rest stop, or halted on a taxi-way).

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

As used herein, the singular terms "a," "an," and "the" may include plural referents, unless the context clearly dictates otherwise. This description, and the claims that follow, should be read to include one or at least one and the singular also includes the plural unless expressly stated or it is obvious that it is meant otherwise. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the terms "approximately," "substantially," "substantial," "roughly" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed is:

1. A policy shaping system for an aggregated network, comprising:
a deep packet inspection (DPI) engine that is communicatively connected, via a plurality of data tunnels, to a plurality of devices aboard a vehicle, the DPI engine including:
one or more processors; and
one or more non-transitory, tangible computer-readable storage media storing instructions that, when executed by the one or more processors, cause the DPI engine to:
receive, via a first data tunnel of the plurality of data tunnels, a first request to deliver first content to a first one or more devices of the plurality of devices;
receive, via a second data tunnel of the plurality of data tunnels, a second request to deliver second content to a second one or more devices of the plurality of devices;
determine (i) a first communication protocol corresponding to the first request, and (ii) a second communication protocol corresponding to the second request;
based upon the determining of the first communication protocol, apply at least one of a first one or more policies to a first forward stream to the vehicle, the first forward data stream including the first content; and
based upon the determining of the second communication protocol, apply at least one of a second one or more policies to a second forward stream to the vehicle, the second forward data stream including the second content.

2. The policy shaping system of claim 1, wherein the instructions, when executed by the one or more processors, further cause the DPI engine to determine (i) a first count corresponding to a first data size of the first content and (ii) a second count corresponding to a second data size of the second content,
wherein the applying of the at least one of the first one or more policies is further based upon the first count,
and wherein the applying of the at least one of the second one or more policies is further based upon the second count.

3. The policy shaping system of claim 2, wherein the instructions, when executed by the one or more processors, further cause the DPI engine to:
detect a first condition indicating that the first tunnel is either not in operation or is degraded;
receive, via the second data tunnel of the plurality of data tunnels, an additional first request to deliver additional first content to at least one of the first one or more devices;
in response to detecting the first condition, determine that the second communication protocol corresponds to the additional first request;
adjust the second count based on an additional first data size of the additional first content; and
based on the second communication protocol and the adjusted second count, apply the second policy to an additional first forward data stream to the vehicle, wherein the additional first forward data stream includes the additional first content.

4. The policy shaping system of claim 1, wherein the determining that the first communication protocol corresponds to the first request is based upon a first marker included in a first explicit congestion notification (ECN) bit of the first request,
and wherein the determining that the second communication protocol corresponds to the second request is based upon a second marker included in a second ECN bit of the second request.

5. The policy shaping system of claim 1, wherein the determining that the first communication protocol corresponds to the first request is based upon a first marker included in a first internet protocol (IP) options message of the first request,
and wherein the determining that the second communication protocol corresponds to the second request is based on a second marker included in a second IP options message of the second request.

6. The policy shaping system of claim 1, wherein the determining that the first communication protocol corresponds to the first request is based upon a first virtual local area network (VLAN) classifier of the first request,
and wherein the determining that the second communication protocol corresponds to the second request is based on a second VLAN classifier of the second request.

7. The policy shaping system of claim 1, wherein the first data tunnel and the first communication protocol correspond to a 4G protocol, and wherein the second data tunnel and the second communication protocol correspond to a 5G protocol.

8. The policy shaping system of claim 7, wherein a first throughput limit of the at least one of the first one or more policies is lower than a second throughput limit of at least one of the second one or more policies.

9. The policy shaping system of claim 1, wherein the applying of the at least one of the first one or more policies or the applying of the at least one of the second one or more policies is further based upon a determination of one or more network performance characteristics via the DPI engine, the one or more network performance characteristics corresponding to usage of the plurality of data tunnels communicatively connecting the DPI engine to the plurality of devices.

10. A computer-implemented method comprising:
receiving, at a deep packet inspection (DPI) engine, via a first data tunnel of a plurality of data tunnels that are communicatively connected to a plurality of devices aboard a vehicle, a first request to deliver first content to a first one or more devices of the plurality of devices;
receiving, at the DPI engine, via a second data tunnel of the plurality of data tunnels, a second request to deliver second content to a second one or more devices of the plurality of devices;
determining, by the DPI engine, (i) a first communication protocol corresponding to the first request, and (ii) a second communication protocol corresponding to the second request;
based upon the determining of the first communication protocol, applying, by the DPI engine, at least one of a first one or more policies to a first forward stream to the vehicle, the first forward data stream including the first content; and
based upon the determining of the second communication protocol, applying, by the DPI engine, at least one of a second one or more policies to a second forward stream to the vehicle, the second forward data stream including the second content.

11. The computer-implemented method of claim 10, further comprising:

determining, by the DPI engine, (i) a first count corresponding to a first data size of the first content and (ii) a second count corresponding to a second data size of the second content,
wherein the applying of the at least one of the first one or more policies is further based upon the first count,
and wherein the applying of the at least one of the second one or more policies is further based upon the second count.

12. The computer-implemented method of claim 11, further comprising:
detecting, by the DPI engine, a first condition indicating that the first tunnel is either not in operation or is degraded;
receiving, by the DPI engine via the second data tunnel of the plurality of data tunnels, an additional first request to deliver additional first content to at least one of the first one or more devices;
in response to detecting the first condition, determining, by the DPI engine, that the second communication protocol corresponds to the additional first request;
adjusting, by the DPI engine, the second count based on an additional first data size of the additional first content; and
based on the second communication protocol and the adjusted second count, applying, by the DPI engine, the second policy to an additional first forward data stream to the vehicle, wherein the additional first forward data stream includes the additional first content.

13. The computer-implemented method of claim 10, wherein the determining that the first communication protocol corresponds to the first request is based upon a first marker included in a first explicit congestion notification (ECN) bit of the first request,
and wherein the determining that the second communication protocol corresponds to the second request is based upon a second marker included in a second ECN bit of the second request.

14. The computer-implemented method of claim 10, wherein the determining that the first communication protocol corresponds to the first request is based upon a first marker included in a first internet protocol (IP) options message of the first request,
and wherein the determining that the second communication protocol corresponds to the second request is based on a second marker included in a second IP options message of the second request.

15. The computer-implemented method of claim 10, wherein the determining that the first communication protocol corresponds to the first request is based upon a first virtual local area network (VLAN) classifier of the first request,
and wherein the determining that the second communication protocol corresponds to the second request is based on a second VLAN classifier of the second request.

16. The computer-implemented method of claim 10, wherein the first data tunnel and the first communication protocol correspond to a 4G protocol, and wherein the second data tunnel and the second communication protocol correspond to a 5G protocol.

17. The computer-implemented method of claim 16, wherein a first throughput limit of the at least one of the first one or more policies is lower than a second throughput limit of at least one of the second one or more policies.

18. The computer-implemented method of claim 10, wherein the applying of the at least one of the first one or more policies or the applying of the at least one of the second one or more policies is further based upon a determination of one or more network performance characteristics via the DPI engine, the one or more network performance characteristics corresponding to usage of the plurality of data tunnels communicatively connecting the DPI engine to the plurality of devices.

* * * * *